United States Patent
Ma et al.

(10) Patent No.: US 10,128,046 B2
(45) Date of Patent: Nov. 13, 2018

(54) WOUND/STACKED CERAMIC FILM CAPACITORS, METHOD FOR MAKING CERAMIC FILM CAPACITORS

(71) Applicants: Beihai Ma, Naperville, IL (US); Uthamalingam Balachandran, Willowbrook, IL (US); Stephen E. Dorris, LaGrange Park, IL (US); Tae H. Lee, Naperville, IL (US)

(72) Inventors: Beihai Ma, Naperville, IL (US); Uthamalingam Balachandran, Willowbrook, IL (US); Stephen E. Dorris, LaGrange Park, IL (US); Tae H. Lee, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 66 days.

(21) Appl. No.: 14/731,738

(22) Filed: Jun. 5, 2015

(65) Prior Publication Data

US 2015/0364257 A1 Dec. 17, 2015

Related U.S. Application Data

(60) Provisional application No. 62/012,857, filed on Jun. 16, 2014.

(51) Int. Cl.
| | |
|---|---|
| *H01G 4/26* | (2006.01) |
| *H01G 4/32* | (2006.01) |
| *H01G 4/005* | (2006.01) |
| *H01G 4/012* | (2006.01) |
| *H01G 4/12* | (2006.01) |
| *H01G 4/228* | (2006.01) |

(52) U.S. Cl.
CPC ............ *H01G 4/26* (2013.01); *H01G 4/005* (2013.01); *H01G 4/012* (2013.01); *H01G 4/1227* (2013.01); *H01G 4/228* (2013.01); *H01G 4/32* (2013.01)

(58) Field of Classification Search
CPC ............... H01G 4/33; H01G 4/26; H01G 4/32
See application file for complete search history.

(56) References Cited

U.S. PATENT DOCUMENTS

| | | | | |
|---|---|---|---|---|
| 5,905,628 | A * | 5/1999 | Okuno | H01G 4/012 29/25.42 |
| 2005/0083635 | A1* | 4/2005 | Ooma | B82Y 10/00 361/305 |
| 2006/0115672 | A1* | 6/2006 | De Gryse | B23K 20/04 428/689 |

(Continued)

*Primary Examiner* — Dion R Ferguson
(74) *Attorney, Agent, or Firm* — Cherskov Flaynik & Gurda, LLC (57) ABSTRACT

The invention provides a process for making ceramic film capacitors, the process comprising supplying a flexible substrate, depositing a first electrode on a first region of the flexible substrate, wherein the first electrode defines a first thickness, overlaying the first electrode with a dielectric film; and depositing a second electrode on the ceramic film, wherein the second electrode defines a second thickness. Also provided is a capacitor comprising flexible substrate, a first electrode deposited on said flexible substrate, a dielectric overlaying the first electrode; and a second electrode deposited on said dielectric.

15 Claims, 9 Drawing Sheets

(56) References Cited

U.S. PATENT DOCUMENTS

| | | | |
|---|---|---|---|
| 2007/0159767 A1* | 7/2007 | Jamison | H01G 4/012 361/301.5 |
| 2008/0310075 A1* | 12/2008 | Takeoka | H01G 4/01 361/301.5 |
| 2010/0202100 A1* | 8/2010 | Koh | H01G 4/206 361/323 |
| 2013/0070385 A1* | 3/2013 | Harada | H01G 4/30 361/301.4 |
| 2015/0116894 A1* | 4/2015 | Fairchild | H01G 4/33 361/301.4 |

* cited by examiner

WOUND/STACKED CERAMIC FILM CAPACITORS, METHOD FOR MAKING CERAMIC FILM CAPACITORS

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to ceramic film capacitors and more specifically, this invention relates to flexible ceramic film capacitors and a method for making flexible ceramic film capacitors.

2. Background of the Invention

The reliance on high power electronic devices continues to increase. Improved performance, increased reliability, compact size and reduced weight are continually sought by electric vehicle manufacturers, stationary power source manufacturers, renewable energy producers and in power management systems.

A salient component in these electronic devices are inverters. Capacitors represent a significant fraction of the inverter volume (approximately 35 percent), inverter weight (approximately 23 percent), and cost (approximately 23 percent). Therefore, improvements are sought in state of the art capacitors.

The performance and lifetime of capacitors available today degrade rapidly with increasing temperature. For example, ripple current capability decreases when temperatures increase from 85° C. to 105° C.

A need exists in the art for a capacitor which can operate at between −40° C. and 150° C. without a decrease in ripple current handling capacity. The capacitor should exhibit high volumetric and gravimetric efficiencies, compared to state of the art capacitors.

SUMMARY OF INVENTION

An object of the invention is to provide a capacitor and method for fabricating capacitors that overcomes many of the drawbacks of the prior art.

Another object of the invention is to provide a capacitor with high volumetric-efficiencies and high dielectric constants. For example, capacitors generated with the invented method can exhibit dielectric constants greater than 50, and volumetric efficiencies on the order of about 1.5 to about 6 microFarads/cc. A feature of the invention is that ceramic films are deposited on flexible substrates for later manipulation into small components. A feature of the invention is that such high efficient, miniaturized componentry are easily embedded in circuit boards or other cramped locales.

Still another object of the present invention is to provide a method for producing capacitors with high gravimetric and volumetric efficiencies. A feature of the invention is the production of ceramic dielectric films on flexible substrates at temperatures from between about 22° C. and about 26° C., and preferably about 25° C. An advantage of the invention is that the method produces capacitors with benign failure features comparable with polymer wound capacitors. This process of making ceramic film capacitor on flexible substrates is adaptable to state of the art polymer film capacitor manufacturing processes. Incorporation of ceramic films that exhibit high dielectric constant will result in higher capacitance density, and enable higher temperature operation. This reduces the overall weight and volume of functional devices without massive changes in capacitor manufacturing process.

Yet another object of the present invention is to provide a method for producing capacitors substantially smaller and more efficient than state of the art capacitors. A feature of the invented method is the production and utilization of submicron PLZT powders in a high rate aerosol deposition protocol onto polymer (e.g. polyimide) films. An advantage of the invented method is that the resulting capacitors have dielectric constants of about 100, breakdown strengths of more than 200 V per microns, and insulation resistivity of greater than $10^{13}$ ohm centimeters.

Briefly, the invention provides a process for making ceramic film capacitors, the process comprising supplying a flexible substrate; depositing a first electrode on a first region of the flexible substrate, wherein the first electrode defines a first thickness; overlaying the first electrode with a dielectric film; and depositing a second electrode on the ceramic film, wherein the second electrode defines a second thickness.

Also provided is a capacitor comprising a flexible substrate; a first electrode deposited on said flexible substrate; a dielectric overlaying the first electrode; and a second electrode deposited on said dielectric.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, the invention provides a method and devices from the method which meet APEEM (Advanced Power Electronics and Electric Machines) requirements for capacitors operating at a wide range of temperatures (between about −50 C and about 150 C) with high volumetric efficiency. An embodiment of the invention provides a cost-effective process for fabricating Pb—La—Zr—TiO (PLZT)-based DC-link capacitors for advanced power inverters. PLZT-based capacitors fabricated by the invented process operate at above 150° C. and 650 V.

Figure 1:
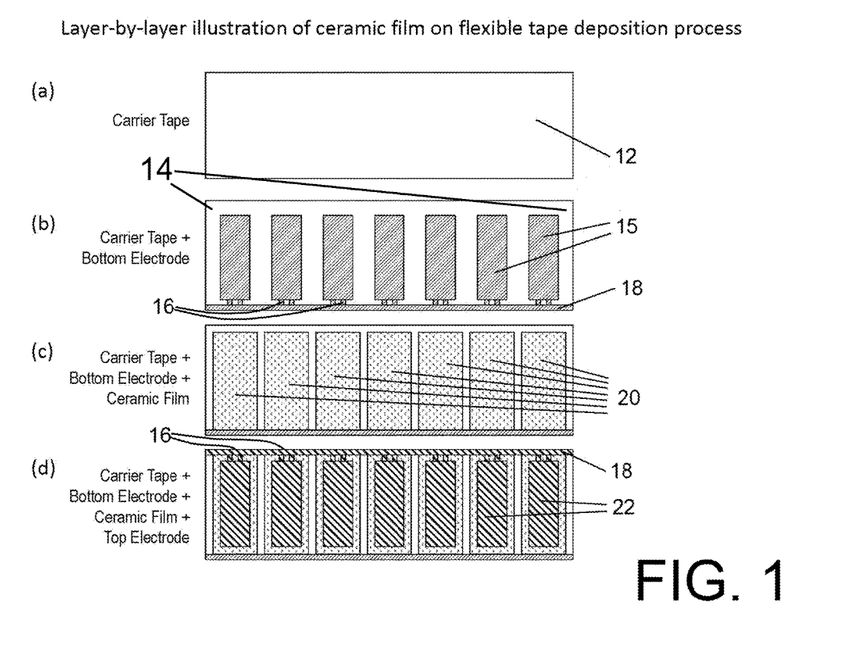
FIG. 1 is a layer-by-layer illustration of a process for producing ceramic film on flexible tape, in accordance with features of the present invention.

FIG. 1 is a layer-by-layer illustration for producing ceramic film on flexible tape. In a preliminary step, carrier or support substrate 12 is provided, such as flexible film. The flexible substrate could be amorphous (e.g., glass) or crystalline, such as an organic based polymer such as polyimide. The substrate can be water proof, and also electrically insulative. In light of the foregoing, melting temperature of the flexible substrate can range from about 400° C. when some polymers are utilized, to more than 1400° C. when glass and other amorphous materials are utilized.

Upon the flexible substrate is deposited a first or bottom electrode 14, preferred defining a plurality of sub-electrodes 15 having a first end and a second end. The electrodes are pictured as positioned coplanarly with each other, and also with their longitudinal axes parallel with each other, such that the longitudinal axes intersect the edges of the respective electrodes defining the ends at approximately right angles. A myriad of deposition processes are suitable, as discussed infra. A salient feature of the deposited electrode is the formation of leads or buss connection regions 16 defined as protuberances at one of the ends of the electrode, and which provide electrical communication between each of the sub electrodes and a buss 18. The buss 18 is positioned in close spatial relation to the ends of the electrode defining the buss connection regions. Generally, these leads (protuberances) are about one-fifth the thickness of a sub-electrode 15. This relatively thin lead will melt away so as to electrically separate from the main body of the sub-electrode 15 in instances of a fault occurring in that sub-electrode. This confers a means for isolating faulty sub-electrodes from the remaining assembly so as to allow the remaining assembly to continue operating.

After deposition of the first electrode, a layer, or plurality of layers of ceramic 20 are deposited over the first electrode. While FIG. 1 depicts a plurality of ceramic pads overlaying the plurality of sub-electrodes, a preferred embodiment is a single ceramic film covering all of the sub-electrodes. Optionally, this embodiment may further include the ceramic filling the longitudionally and lattitudinally extending spaces between the subelectrodes and buss bar respectively. This would result in the sub-electrodes being completely covered by the ceramic layer such that substantially all exterior surfaces of the subelectrodes 15 are physically and electrically isolated from surrounding structures.

A second electrode 22 is then deposited on top of the ceramic film.

The electrodes are electrical conductors selected from the group consisting of Al, Cu, Ag, Au, Pt, Ti, Ni, Fe, Ta, Mo, Zn, Al-alloy, Cu-alloy, Ag-alloy, Pt-alloy, Ti-alloy, Ni-alloy, Fe-alloy, Ta-alloy, Mo-alloy, Zn-Alloy and combinations thereof.

Several processes can successfully deposit bottom and top electrodes, and/or the ceramic films. For example, electron-beam evaporation can be employed for metallization of electrodes, and thermal evaporation and/or magnetron sputtering deposition can be used to deposit electrode as well. All of these processes can be integrated into a reel to reel process. Similarly, aerosol deposition (AD) can deposit ceramic films on bottom electrode metallized flexible substrate, so can pulsed laser deposition (PLD) and magnetron sputtering deposition (MSD).

Fabrication Detail

Figure 2:
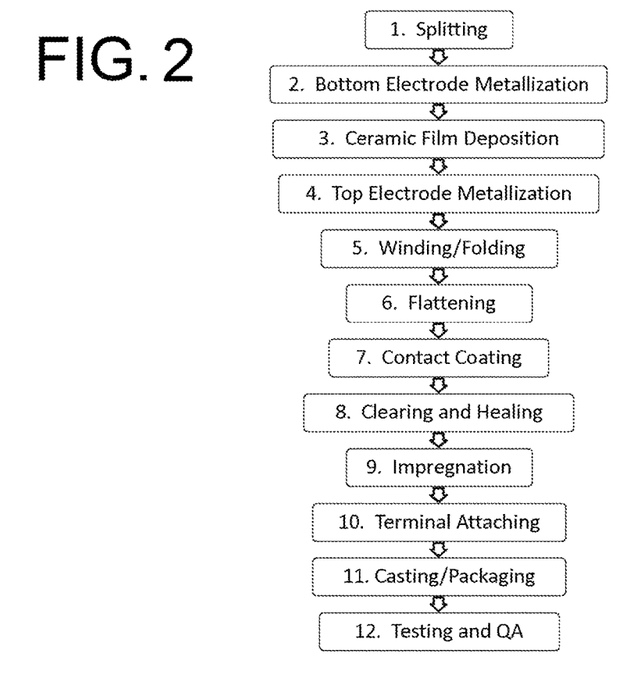
FIG. 2 is a flowchart of an embodiment of the invented method, in accordance with features of the present invention.

FIG. 2 is a flowchart of the invented method for manufacturing wound or stacked ceramic film capacitors. The steps of the flow chart are described below:

1. Slitting: The as-received rolls of thin flexible insulating films are likely in different width from that required for the reel-to-reel process, described infra. In such instances, the received rolls are slit, cut, or otherwise resized into smaller strips that fit onto and are contained within the confines of the manufacturing reels 24.
2. Bottom electrode metallization: The thin flexible insulating tape is metallized with aluminum or metal by physical vapor deposition processes, such as thermal evaporation, electron beam evaporation, sputtering.
3. Ceramic film deposition: Ceramic film of about 1 micrometer to about 30 micrometers is deposited by a reel-to-reel process following the metallization step. The deposition process can be aerosol deposition, atomic layer deposition, pulsed laser deposition, sputtering, electron-beam co-evaporation, and other deposition processes suitable for reel-to-reel manufacturing. A suitable lay down process is Aerosol Deposition (AD) which generates a thick film (e.g., approximately 10 microns) at room temperature in approximately 10 minutes.
4. Top Electrode Metallization: Following the deposition of ceramic film, the tape is again metallized with aluminum or metal by physical vapor deposition process. Either the bottom electrode, or the top electrode, or both can be patterned in desirable sizes and shapes of regions that are connected to the along-edge electrode bus conduct. Or, as an alternative architecture, the electrode can have different thicknesses: thicker in the along edge region (lower resistance per square) and thinner when farther away from the electrode bus conduct.
5. Winding or folding: The assembled construct comprising a ceramic film capacitor tape is rolled into cylinders or folded/stacked into blocks of desired dimensions and capacitance.
6. Flattening: The rolled cylinders or folded blocks are usually flattened to reduce the overall capacitor footprint. Reduction in volume of between about 10 and about 90 percent of an original wound or folded configuration is achieved, with a 40 to 80 percent reduction typical and about a 50 percent reduction most typical.
7. Contact coating: Also known as schoopage, the end electrodes are coated with a liquefied contact metal (e.g., tin, zinc or aluminum), which is sprayed with compressed air on both lateral ends of the winding or stacking.
8. Clearing and healing: The windings or stacking with electrically connected by the schoopage are "cleared" or "healed" to isolate any defects in the capacitor. This is done by applying a voltage across the electrodes of the winding or stacking so that any existing defects will be "burned away".

9. Impregnation: For increased protection of the capacitor against environmental influences, especially moisture, the winding is impregnated with an insulating fluid, such as silicone oil.
10. Terminal attaching: The terminals of the capacitor are soldered or welded on the end metal contact layers of the schoopage.
11. Casting and packaging: After attaching the terminals, the capacitor body is potted into an external casing, or is dipped into a protective coating.
12. Test and QA: Capacitors produced are tested for quality assurance.

Reel to Reel
Process Detail

Figure 3A:
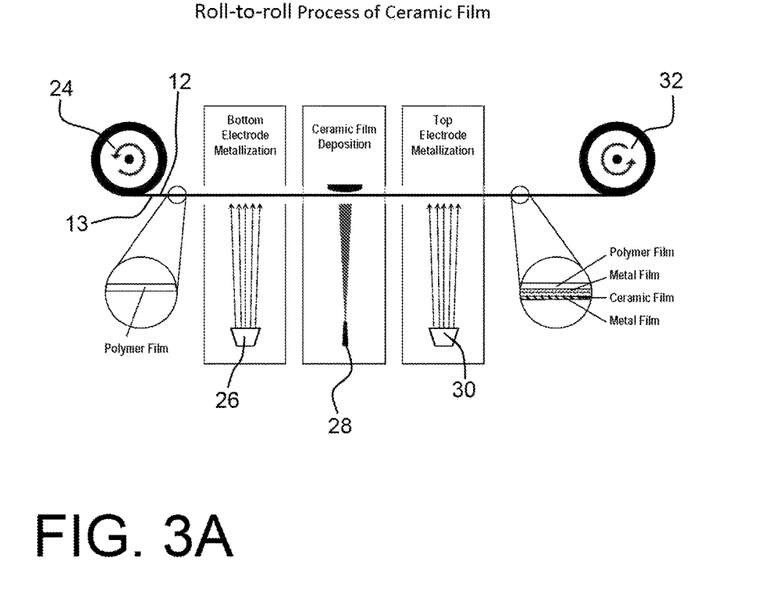
FIGS. 3A-C are schematic depictions of a reel-to-reel capacitor fabrication process, in accordance with features of the present invention.

FIG. 3A depicts a reel to reel protocol for the production of flexible capacitors. As disclosed supra, a flexible substrate 12 is preferably chosen to support the electrodes. The flexible substrate may be supplied in a first roll 24. As depicted by the arrows in FIG. 3, the reel to reel process transports the forming construct from left to right to be subjected to various deposition procedures discussed infra.

Upon deploying from the first roll, a first side 13 of the substrate is subjected to a first metallization process 26 whereby the first plurality of sub-electrodes 15 are deposited. Metal deposition thicknesses of between about 2 nanometers to 4 microns are suitable.

After first metallization, the substrate is advanced linearly along a reel-to-reel transom to be subjected to a ceramic film process. For example, as the newly metallized substrate advances from left to right in the drawing, it is subjected to a ceramic film deposition step 28. Deposition thicknesses of between approximately 1 micron and about 30 microns are suitable.

After ceramic deposition, the now ceramic-covered construct is subjected to a second metallization step 30.

Upon completion of this second metallization step, whereby a second plurality of electrodes 22 are deposited, the entire construct is harvested or otherwise stored on a second reel 32. In an embodiment of the invention, the radius of curvature of the second reel can be as large as approximately 10 cm. Typically, radius of curvature of the formed wound capacitor body is about 1 mm to about 5 cm.

Figure 3B:
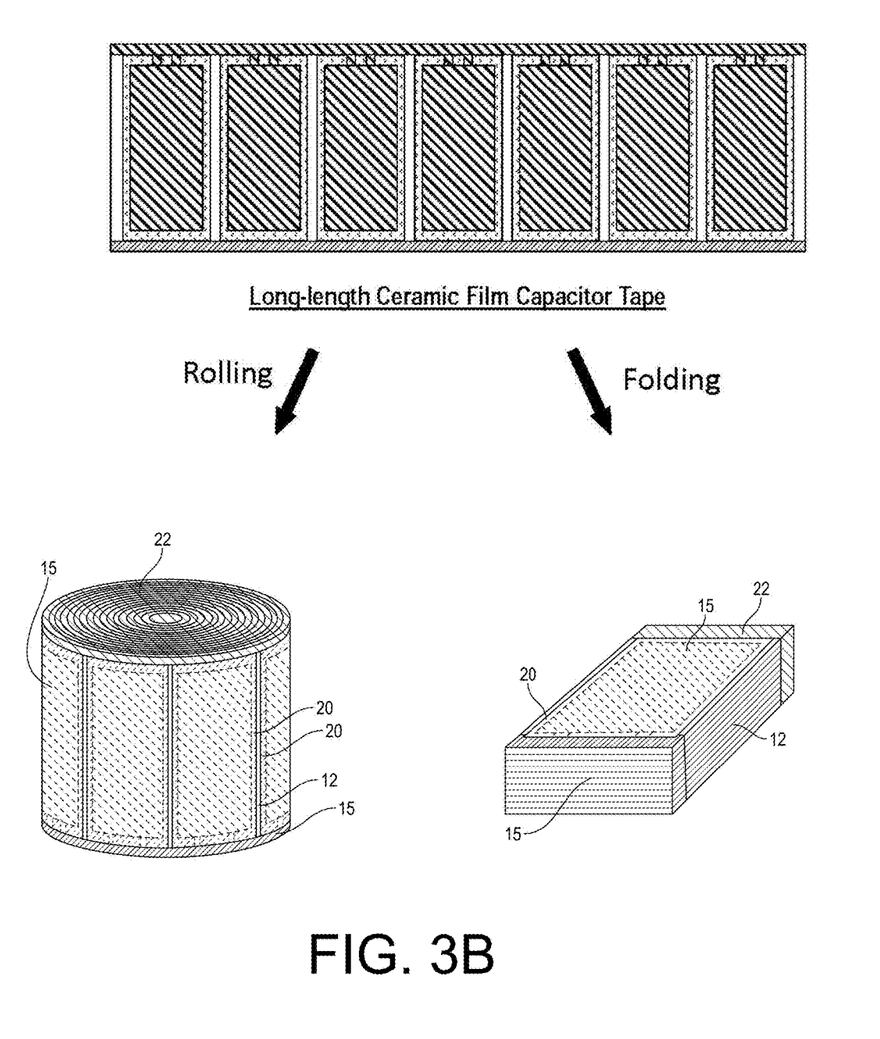
Figure 3C:
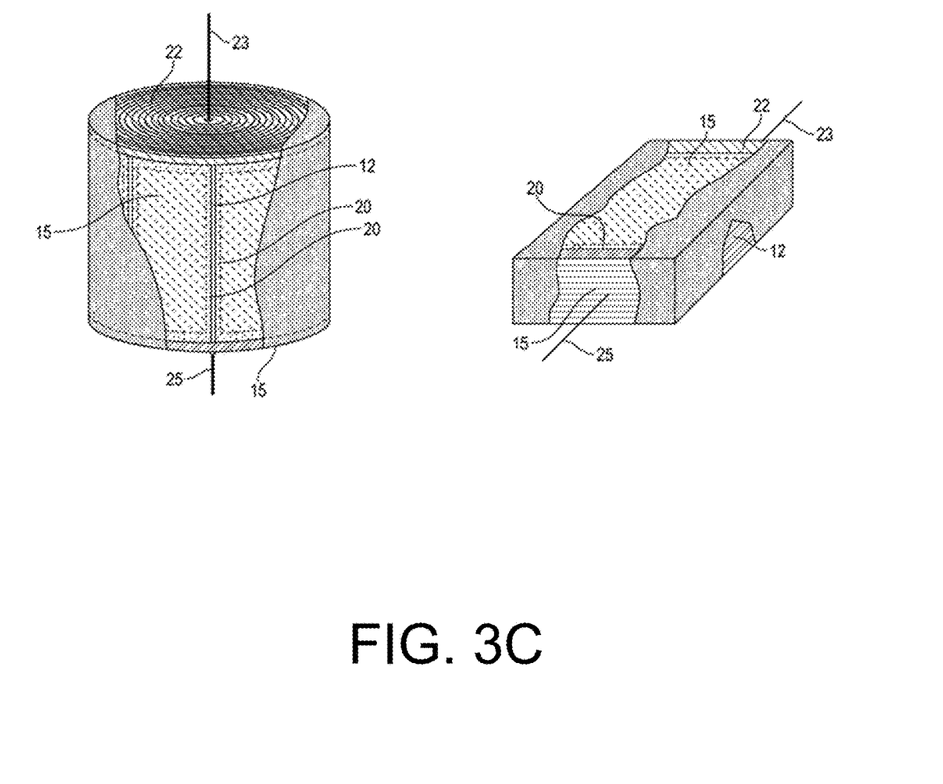

As depicted in FIG. 3B, the flexible substrate defines substantially the entire exterior surface of the construct if the construct is rolled or otherwise folded to the radii noted supra. If metal and ceramic deposition occurs at a point anywhere medial from the longitudinal edges of the flexible substrate, then the ends of the rolled or folded substrate is likewise defined by the flexible substrate. This confers moisture and electrical insulation characteristics to the construct. Such waterproofing and electrical insulation qualities are enable the use of the construct in harsh environs and also vis-à-vis adjacent structures in closely packed componentry. As also depicted in FIG. 3C, in either the rolled configuration or the stacked configuration showing external leads 23 and 25 extending beyond a cover for the constructs.

In summary of this point, the flexible substrate has a first surface upon which deposition takes place, wherein longitudinally extending, laterally disposed regions of the first surface define a longitudinally extending channel proximal to at least one edges of the substrate, the channel adapted to receive a longitudinally extending ridge extending from laterally disposed regions of a second surface of the flexible substrate when the capacitor is rolled upon itself.

PLZT Deposition
Detail

A myriad of materials are suitable as a dielectric. In an embodiment, the dielectric film deposited and utilized is a ceramic selected from the group consisting of perovskites having a general formula $ABO_3$, lead zirconate titanate, lanthanum doped lead zirconate titanate, lead magnesium niobate, barium titanate, barium strontium titanate, and combinations thereof.

Powders of Pb—La—Zr—Ti oxide (PLZT) are made by a method for preparing fine (submicron) powders of multicomponent oxides, for example via combustion synthesis. During combustion synthesis, an aqueous solution is prepared from nitrates of the constituent oxides. A fuel, such as glycine ($C_2H_5O_2N$), citric acid ($C_6H_8O_7$), or hydrazine ($N_2H_4$) is added to the nitrate solution, and the solution is heated either on a hot plate inside a fume hood or by spraying the solution into a heated furnace. When most of the water has evaporated and the temperature of the solution reaches approximately 100° C., the solution ignites. During combustion of the solution, which lasts 5-10 minutes, PLZT powder is formed. The powder is then heated at 500° C. for about 2 hours in air to remove any residual carbon.

Figure 4:
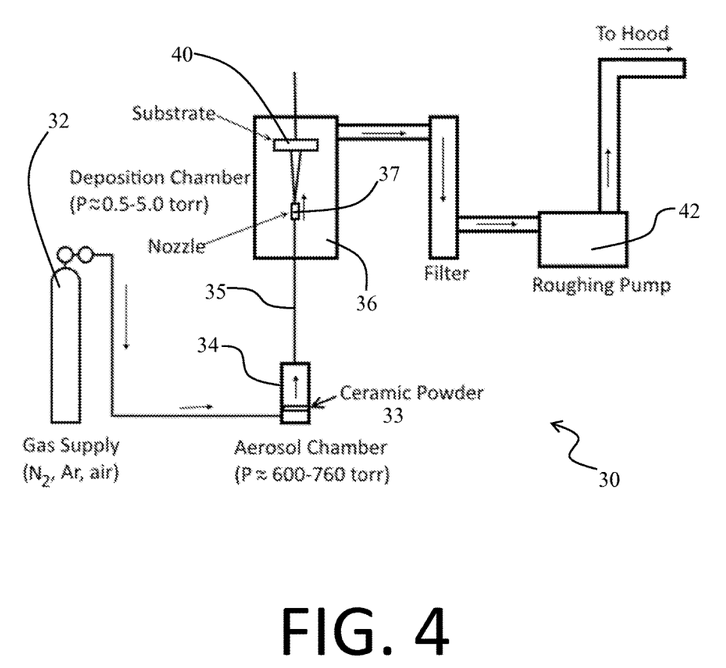
FIG. 4 is a schematic depiction of a ceramic deposition process, in accordance with features of the present invention.

In the AD process depicted as numeral 30 in FIG. 4, carrier gas 32 mixes with fine powder 33 at near-ambient pressure in an aerosol chamber 34, forming an aerosol. (The ceramic powders are aerosolized by flowing a carrier gas through powder that is held inside the aerosol chamber 34.)

The aerosol flows out of the aerosol chamber 34 via a conduit 35 or other means of egress which terminates with a nozzle. In an embodiment of the system, the conduit 35 is positioned between the aerosol chamber and a deposition chamber 36 discussed supra such that the conduit is not confined by the either the aerosol chamber and the deposition chamber. The deposition chamber encapsulates or otherwise isolates a substrate 40 intended to be covered by the moieties comprising the aerosol.

The aerosol flows out of the nozzle 37 into the deposition chamber 36 held at pressure lower than that maintained within the aerosol chamber. For example the deposition chamber is maintained at a low pressure of approximately 0.5-5.0 torr. The powder may be formed via combustion synthesis, but it is not necessary that the powder be formed via combustion synthesis. The pressure difference between the two chambers propels the aerosol toward the substrate at high speed (150-600 m/s). Due to its high kinetic energy, not thermal energy, the powder densifies as it hits the substrate 40.

Optionally, a roughing pump 42 is positioned downstream of the deposition chamber to initially evacuate the system and/or to facilitate the formation and maintenance of a negative pressure downstream in the system.

EXAMPLE 1

Approximately 8 micron thick PLZT films were deposited on aluminum-metallized polyimide films, and at room temperature (e.g. between approximately 19 C and approximately 30 C, and more typically between approximately 23 C and 26 C). The films exhibited dielectric properties suitable for high-temperature applications. Also, inasmuch as the films were formed at room temperatures, typical deleterious defects (such as pyrochlore phase formation) are eliminated.

Figure 5A:
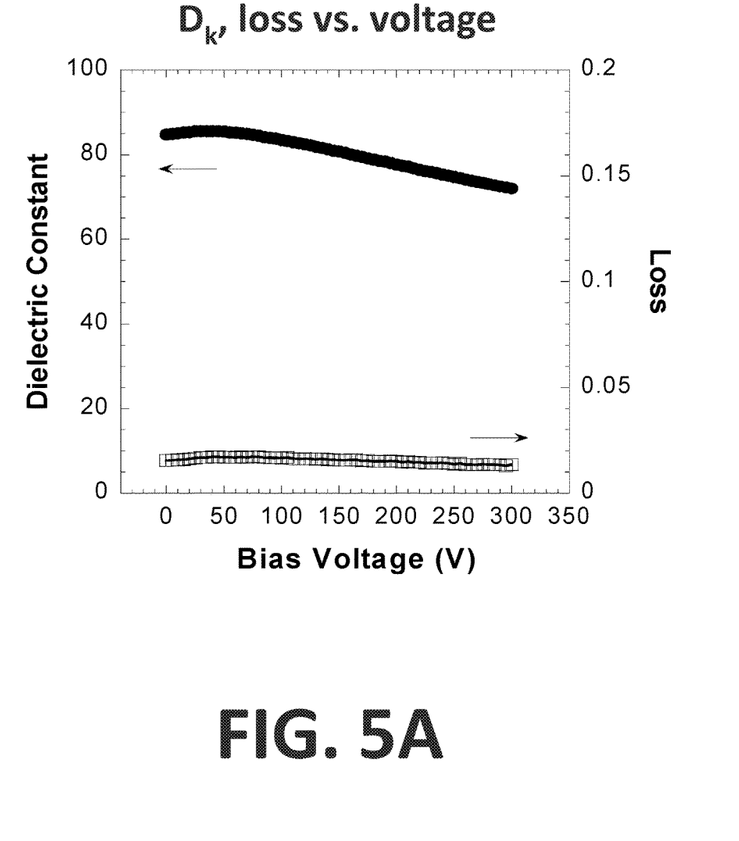
FIGS. 5A-B are graphs showing dielectric constants of capacitors formed in accordance with features of the present invention.

FIG. 5A depicts the dielectric constant of the manufactured capacitor along a voltage range ranging from 0 to more than 300 V. The graph shows a fairly constant dielectric constant of approximately 80 throughout this voltage range. Other experiments have achieved dielectric constants of approximately 100 with 300 V biases.

Figure 5B:
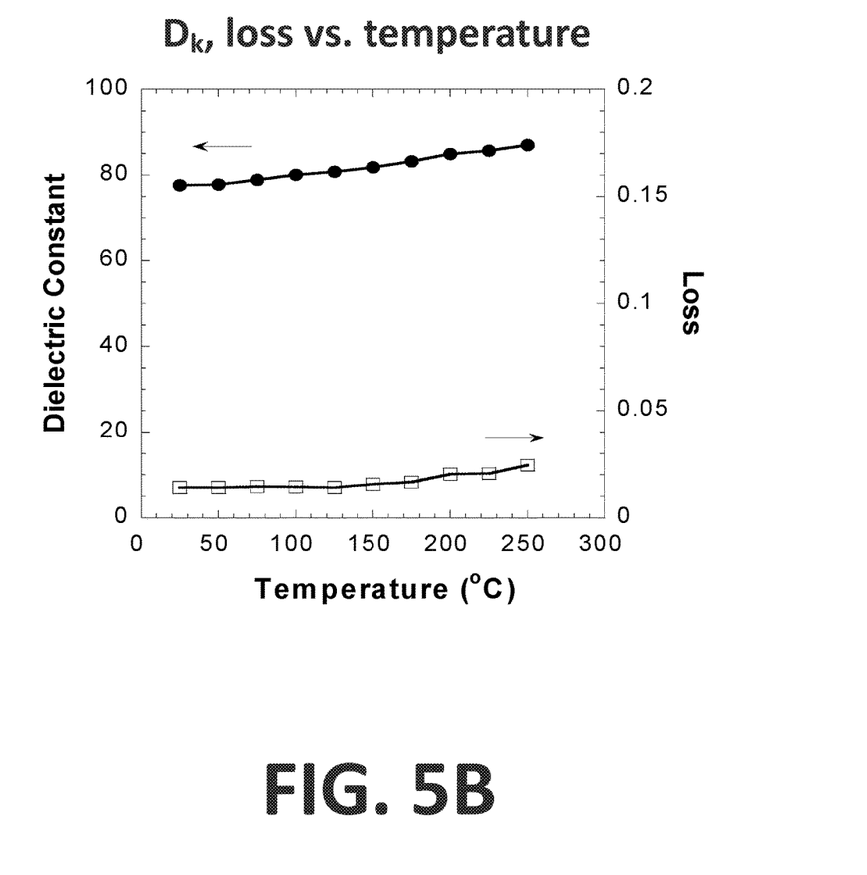

FIG. 5B depicts the dielectric constant of the manufactured capacitor along a temperature range spanning 20° C. to 250° C. This graph shows the dielectric constant increasing with temperature.

Figure 6A:
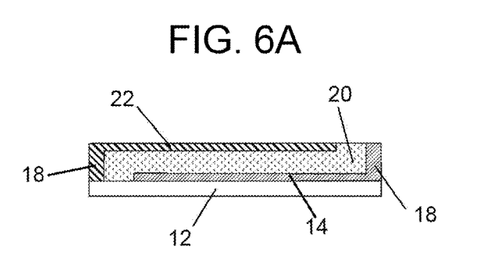
FIGS. 6A-C are cross sectional illustrations for ceramic film capacitor on flexible substrate in single layer configuration, wound configuration and stacked configuration, in accordance with features of the present invention.
Figure 6B:
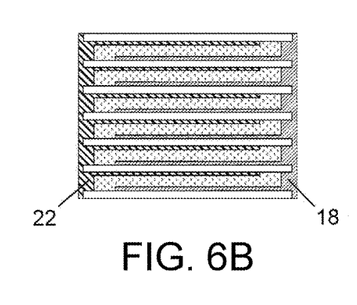
Figure 6C:
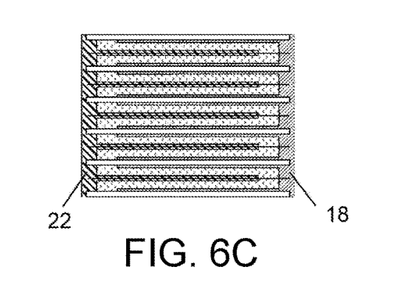

FIGS. 6a-C are cross-sectional illustrations of ceramic film capacitors in flexible substrate. FIG. 6A depicts a single layer element. FIG. 6B depicts a wound capacitor configuration. FIG. 6C depicts a stacked capacitor configuration. As discussed above, the bus configuration is thicker than other aspects of either deposited electrodes. In an embodiment of the invention, the inventors found that the bus defines a metal thickness of between 2 to 5 times greater than the top and bottom electrodes. For example, thicknesses of the top and top electrodes can be about 10 to about 100 nanometers while concomitantly, the thickness of the bus area can range from about 50 to about 500 nanometers, respectively.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A capacitor comprising:
    a. a flexible polymer-based single substrate acting as a support substrate wherein said single flexible polymer-based substrate comprises a film;
    b. a first electrode deposited upon said flexible polymer-based substrate at near ambient pressure;
    c. a dielectric fully overlaying the first electrode; and
    d. a second electrode deposited on said dielectric;
        wherein said dielectric comprises a ceramic film deposited on the first electrode and flexible polymer-based substrate combination wherein said ceramic film exhibits a high dielectric constant wherein combination of said support substrate, first electrode, dielectric, and second electrode form the capacitor.

2. The capacitor as recited in claim 1 wherein the flexible substrate is capable of achieving a radius of curvature of between approximately 1 to 10 millimeters.

3. The capacitor as recited in claim 1 wherein each of said first and second electrodes define a bus region, a main current collection region, and a linking region electrically connecting the bus region to the collection region.

4. The capacitor as recited in claim 3 wherein the bus region is approximately 2-5 times thicker than the linking region.

5. The capacitor as recited in claim 1 wherein said first and second electrodes each define a plurality of segments electrically connected via a bus.

6. The capacitor as recited in claim 1 wherein the dielectric substantially electrically isolates the first electrode from the second electrode.

7. The capacitor as recited in claim 5 wherein the dielectric substantially encapsulates the plurality of segments defining the first electrode.

8. The capacitor as recited in claim 1 wherein the capacitor has a radius of curvature of between approximately 1 to 10 millimeters.

9. The capacitor as recited in claim 1 wherein the dielectric is a ceramic selected from the group consisting of perovskites having a general formula $ABO_3$, lead zirconate titanate, lanthanum doped lead zirconate titanate, lead magnesium niobate, barium titanate, barium strontium titanate, and combinations thereof.

10. The capacitor as recited in claim 1 wherein the electrodes are electrical conductors selected from the group consisting of Al, Cu, Ag, Au, Pt, Ti, Ni, Fe, Ta, Mo, Zn, Al-alloy, Cu-alloy, Ag-alloy, Pt-alloy, Ti-alloy, Ni-alloy, Fe-alloy, Ta-alloy, Mo-alloy, Zn-Alloy and combinations thereof.

11. The capacitor as recited in claim 1 wherein the dielectric covers regions of the flexible substrate not overlaid with the first electrode.

12. The capacitor as recited in claim 11 wherein the regions not covered are electrically isolated from the first electrode.

13. The capacitor as recited in claim 1 wherein the flexible substrate defines a waterproof and electrically insulative exterior to the capacitor when the capacitor is rolled or folded.

14. The capacitor as recited in claim 1 wherein said substrate is folded to form a stacked capacitor.

15. The capacitor as recited in claim 1 wherein said polymer-based substrate is not exposed to temperatures exceeding 400° C.

\* \* \* \* \*